(12) United States Patent
Cymbal et al.

(10) Patent No.: US 7,371,180 B2
(45) Date of Patent: May 13, 2008

(54) DOUBLE PIVOTING TILT JOINT

(75) Inventors: William D. Cymbal, Freeland, MI (US); Richard K. Reife, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 187 days.

(21) Appl. No.: 11/339,593

(22) Filed: Jan. 25, 2006

(65) Prior Publication Data

US 2007/0173336 A1    Jul. 26, 2007

(51) Int. Cl.
*F16D 3/44* (2006.01)

(52) U.S. Cl. .................................. 464/119; 403/161

(58) Field of Classification Search .......... 403/61, 403/116, 161, 162; 464/119, 136
See application file for complete search history.

(56) References Cited

U.S. PATENT DOCUMENTS

| 272,339 | A | * | 2/1883 | Shuman ..................... 464/136 |
| 636,758 | A | | 11/1899 | Casaday |
| 1,096,235 | A | * | 5/1914 | Fox ........................ 464/136 X |
| 1,563,629 | A | * | 12/1925 | Hensley ................... 464/136 X |
| 1,836,095 | A | | 12/1931 | Van Ranst |
| 3,178,908 | A | * | 4/1965 | Stillwagon, Jr. ............ 464/132 |
| 4,166,366 | A | | 9/1979 | Okuda et al. |
| 4,272,972 | A | | 6/1981 | James |
| 4,572,682 | A | | 2/1986 | Iwata |
| 4,692,127 | A | | 9/1987 | Wagner |
| 4,964,840 | A | | 10/1990 | Kapaan |
| 4,983,143 | A | | 1/1991 | Kekine et al. |
| 5,551,919 | A | | 9/1996 | Cherpician |
| 5,766,081 | A | | 6/1998 | Desmarais |
| 6,325,724 | B1 | | 12/2001 | Sato et al. |

FOREIGN PATENT DOCUMENTS

EP    0 042 325    9/1981
GB    2 339 610    2/2000

* cited by examiner

*Primary Examiner*—Greg Binda
(74) *Attorney, Agent, or Firm*—Michael D. Smith

(57) ABSTRACT

The invention provides a double pivot tilt joint for connecting two shafts for synchronous rotation and for tilting movement relative to one another. The double pivot tilt joint includes a first shaft member and a first pivot pin extending at least partially through the first shaft member. The double pivot tilt joint also includes a pivot block receiving the first pivot pin such that the first shaft member and the pivot block are pivotally coupled to one another about the first pivot pin. The double pivot tilt joint also includes a second pivot pin extending at least partially through the pivot block transverse to the first pivot pin. The double pivot tilt joint also includes a second shaft member receiving the second pivot pin such that the pivot block and the second shaft member are pivotally coupled to one another about the second pivot pin. The double pivot tilt joint also includes a groove defined by the first pivot pin and receiving the second pivot pin.

15 Claims, 2 Drawing Sheets

DOUBLE PIVOTING TILT JOINT

FIELD OF THE INVENTION

The invention relates to a joint for connecting two shafts for concurrent rotation and for pivoting movement relative to one another.

BACKGROUND OF THE INVENTION

The steering apparatus of a vehicle often includes a steering wheel, a steering gear that steers the vehicle's wheels, and a steering shaft that provides a linkage between the steering wheel and the steering gear. It is common to use a plurality of shafts coupled together axially by universal joints because there is limited chance for locating the steering gear on the central axial line of the steering wheel. These shafts are coupled for concurrent or synchronous rotation and for pivoting movement relative to one another. A Cardan joint can be used to couple two shafts together. A Cardan joint includes a crosspiece inserted in a freely oscillatory manner between a pair of joint yokes. Another example of a joint for connecting two shafts is disclosed in U.S. Pat. No. 6,325,724.

SUMMARY OF THE INVENTION

The invention provides a double pivot tilt joint for connecting two shafts for synchronous rotation and for tilting movement relative to one another. The double pivot tilt joint includes a first shaft member and a first pivot pin extending at least partially through the first shaft member. The double pivot tilt joint also includes a pivot block receiving the first pivot pin such that the first shaft member and the pivot block are pivotally coupled to one another about the first pivot pin. The double pivot tilt joint also includes a second pivot pin extending at least partially through the pivot block transverse to the first pivot pin. The double pivot tilt joint also includes a second shaft member receiving the second pivot pin such that the pivot block and the second shaft member are pivotally coupled to one another about the second pivot pin. The double pivot tilt joint also includes a groove defined by the first pivot pin and receiving the second pivot pin.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
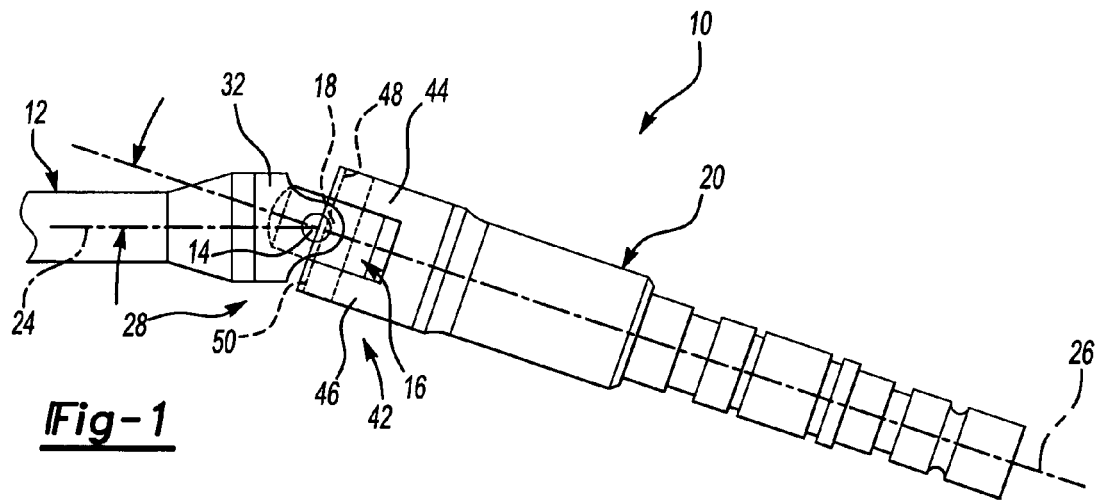
FIG. 1 is a front view of a double pivot tilt joint according to the exemplary embodiment of the invention.
Figure 2:
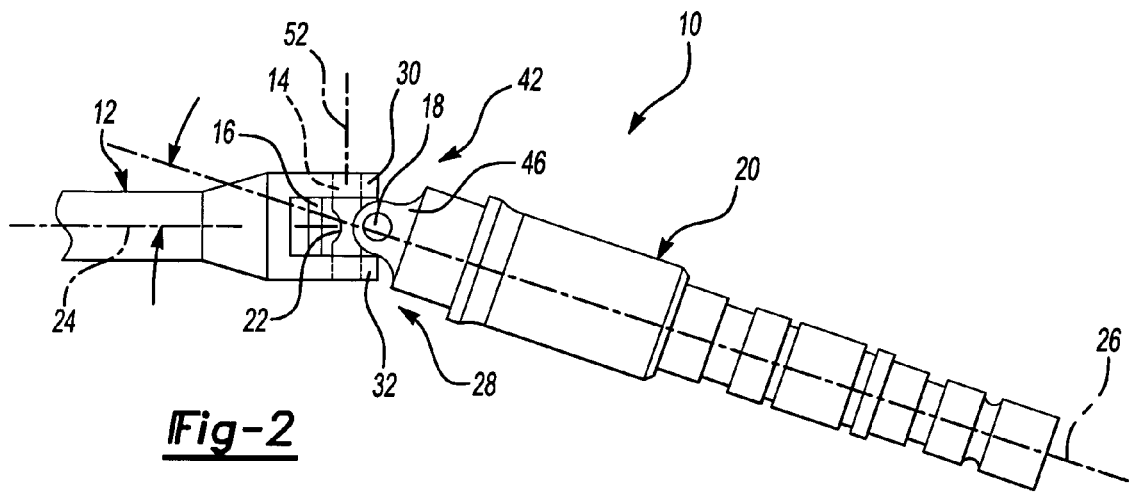
FIG. 2 is a top view of the double pivot tilt joint according to the exemplary embodiment of the invention.

A plurality of different embodiments of portions of the invention are shown in the Figures of the application. Similar features are shown in the various embodiments of the invention. Similar features have been numbered with a common reference numeral and have been differentiated by an alphabetic designation. Also, to enhance consistency, features in any particular drawing share the same alphabetic designation even if the feature is shown in less than all embodiments. Similar features are structured similarly, operate similarly, and/or have the same function unless otherwise indicated by the drawings or this specification. Furthermore, particular features of one embodiment can replace corresponding features in another embodiment unless otherwise indicated by the drawings or this specification.

The invention provides a double pivot tilt joint 10 for connecting two shafts for synchronous rotation and for tilting movement relative to one another. The double pivot tilt joint 10 connects a first shaft member 12 having a centered longitudinal axis 24 and a second shaft member 20 having a centered longitudinal axis 26. The double pivot tilt joint 10 allows for the transmission of rotation between the first shaft member 12 and the second shaft member 20. Rotation can be transmitted when the axis 24, 26 are aligned and when the axis 24, 26 are angled or transverse to one another.

The exemplary first shaft member 12 defines a yoke 28 with first and second arms 30, 32 spaced from one another. Apertures 34, 36 are defined in the arms 30, 32, respectively. The pivot block 16 is disposed between the arms 30, 32 and defines an aperture 38. A first pivot pin 14 extends along a centered longitudinal axis 52 and is received in the apertures 34, 36, 38. In the exemplary embodiment of the invention, the first pivot pin 14 can be slidably received in the apertures 34, 36, 38. As will be set forth below, the first pivot pin 14 can be maintained in position in the apertures 34, 36, 38 by the second pivot pin 18.

The exemplary second shaft member 20 defines a yoke 42 with first and second arms 44, 46 spaced from one another. Apertures 48, 50 are defined in the arms 44, 46 respectively. The pivot block 16 is disposed between the arms 44, 46 and defines an aperture 40. The aperture 40 extends transverse to the aperture 38. The apertures 38, 40 communicate with one another. The second pivot pin 18 is received in the apertures 40, 44, 46.

A groove 22 is defined by the first pivot pin 14. The groove 22 communicates with the aperture 40 and receives the second pivot pin 18 when the second pin 18 is inserted in the apertures 40, 44, 46. The cooperation between the second pivot pin 18 and the groove 22 substantially prevents the first pivot pin 14 from moving along the axis 52. Additional operations to limit movement of the first pivot pin 14 are therefore not required. Also, the arrangement also allows the size of the double pivot tilt joint 10 to be reduced in some operating environments. Also, it has been observed that the arrangement reduces wobble in the double pivot tilt joint 10. One or more of these benefits may not be observed and other benefits may be enjoyed in alternative embodiments of the invention.

In the exemplary embodiment of the invention, the groove 22 is annular. The groove 22 extends fully around the first pivot pin 14 relative to the axis 52. In alternative embodiments of the invention, the groove 22 could be more notch-like, such as extending along a straight axis spaced from the axis 52. The exemplary groove 22 is substantially centered with respect to the first pivot pin 14, however could be spaced closer to one end of the first pivot pin 14 in alternative embodiments of the invention. The second pivot pin 18 includes an outer surface 24 and the shape of the groove 22 corresponds to the outer surface 24. For example, the outer surface 24 is cylindrical and the shape of the groove 22 is semi-circular. In alternative embodiments of the invention, the shapes of the outer surface 24 and the groove 22 could be non-circular.

Figure 3:
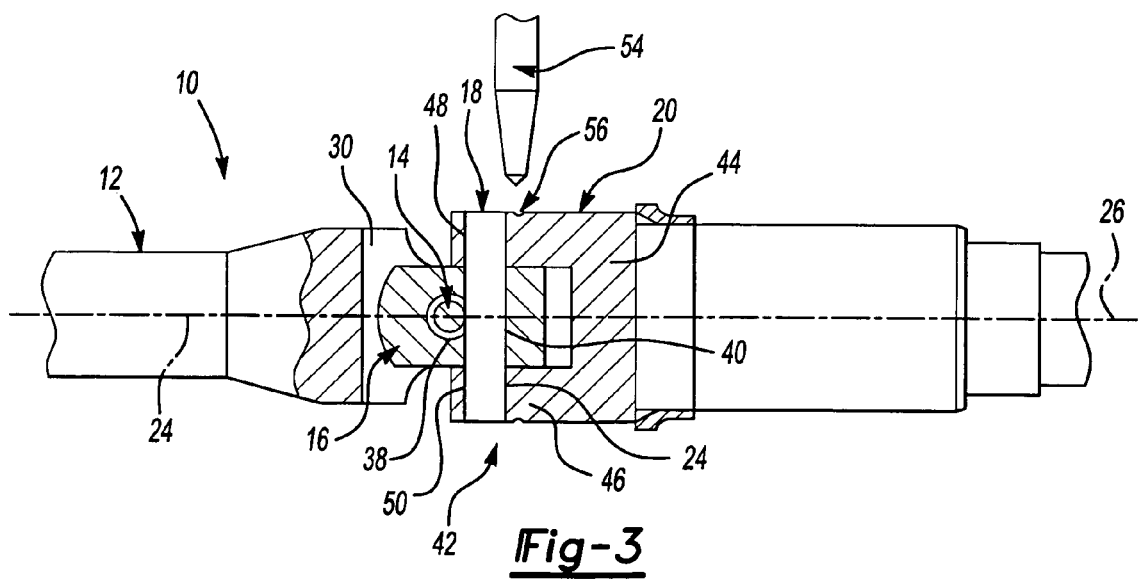
FIG. 3 is front view of the double pivot tilt joint partially cut-away.
Figure 4:
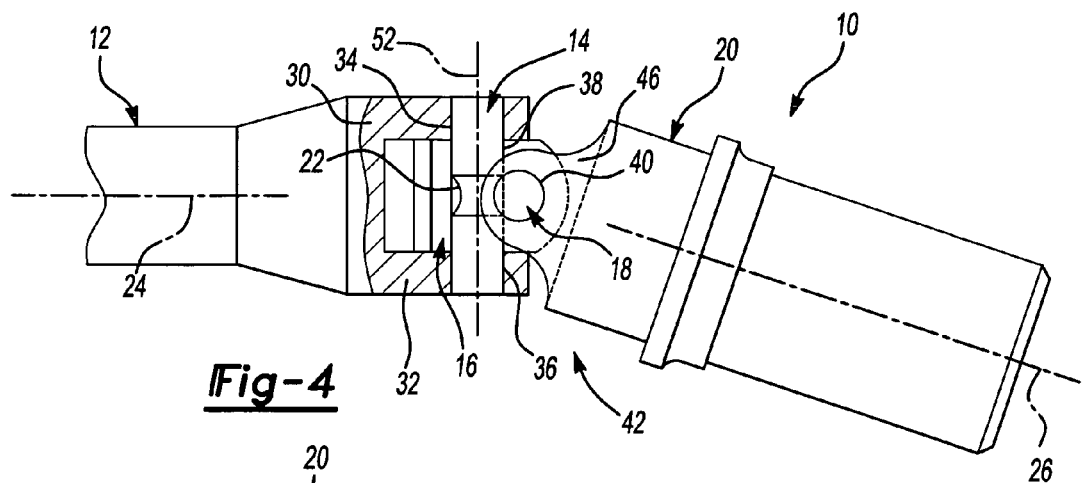
FIG. 4 is top view of the double pivot tilt joint partially cut-away.
Figure 5:
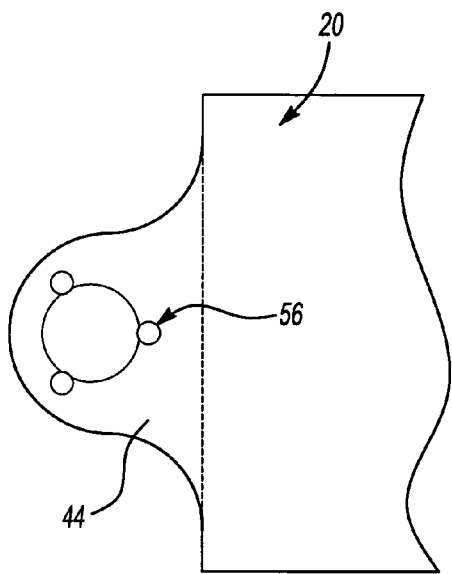
FIG. 5 is a partial view of one of the shafts associated with the double pivot tilt joint showing locations for staking one of the pivot pins.

In the exemplary embodiment of the invention, the second pivot pin 18 is fixed to the second shaft member 20 and the first pivot pin 14 and the second pivot pin 18 are slidably engaged with the pivot block 16. As best shown in FIGS. 3 and 5, a staking tool 54 can deform the arm 44 of the yoke 42 adjacent the second pivot pin 18. A quantity 56 of material used to form the arm 44 can be urged against the second pivot pin 18. As shown in FIG. 5, the arm 44 can be staked in more than one location. Both arms 44, 46 can be staked, but only one could be staked in various embodiments of the invention.

Figure 6:
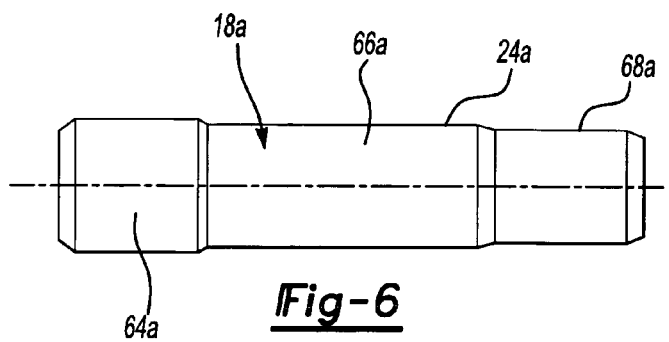
FIG. 6 is an alternative embodiment of one of the pivot pins.
Figure 7:
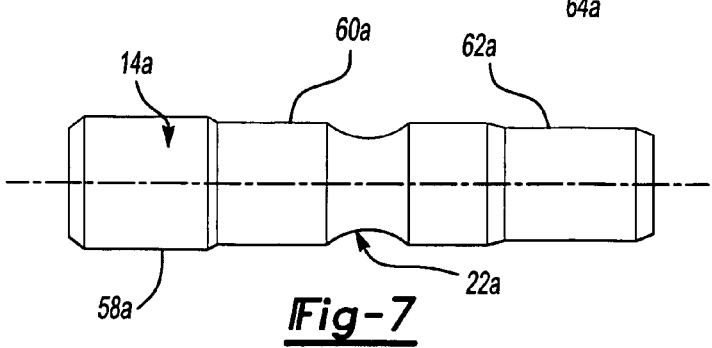
FIG. 7 is another alternative embodiment of one of the pivot pins.

FIGS. 6 and 7 shows alternative first and second pivot pins 14a, 18a. As shown in FIG. 7, the first pivot pin 14a defines a groove 22a and the second pivot pin 18a has an outer surface 24a. The first pivot pin 14a includes outer surface portions 58a, 60a, 62a. The surface portions 58a, 62a would be received in the arms 34, 36 of the yoke 28 and the surface portion 60a would be received in the aperture 38 of the pivot block 16. The diameters of the surface portions 58a, 62a are different from the diameter of the surface portion 60a so that either the surface portions 58a, 62a engage the arms 34, 36 of the yoke 28 in a press fit arrangement or the surface portion 60a engages the aperture 38 of the pivot block 16 in a press-fit arrangement.

As shown in FIG. 6, the outer surface 24a includes surface portions 64a, 66a, 68a. The surface portions 64a, 68a would be received in the arms 44, 46 of the yoke 42 and the surface portion 66a would be received in the aperture 50 of the pivot block 16. The diameters of the surface portions 64a, 68a are different from the diameter of the surface portion 66a so that either the surface portions 64a, 68a engage the arms 44, 46 of the yoke 42 in a press fit arrangement or the surface portion 66a engages the aperture 50 of the pivot block 16 in a press-fit arrangement.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A double pivot tilt joint comprising:
   a first shaft member;
   a first pivot pin extending at least partially through said first shaft member;
   a pivot block receiving said first pivot pin such that said first shaft member and said pivot block are pivotally coupled to one another about said first pivot pin;
   a second pivot pin extending at least partially through said pivot block transverse to said first pivot pin and including an outer surface;
   a second shaft member receiving said second pivot pin such that said pivot block and said second shaft member are pivotally coupled to one another about said second pivot pin; and
   a groove defined by said first pivot pin with said groove being annular and having a shape corresponding to said outer surface of said second pivot pin and with said groove receiving said second pivot pin.

2. The double pivot tilt joint of claim 1 wherein said groove is further defined as extending fully around said first pivot pin.

3. The double pivot tilt joint of claim 1 wherein said groove is further defined as being substantially centered with respect to said first pivot pin.

4. The double pivot tilt joint of claim 1 wherein said outer surface is cylindrical and said shape of said groove is semi-circular.

5. The double pivot tilt joint of claim 1 wherein said second pivot pin is fixed to said second shaft member.

6. The double pivot tilt joint of claim 5 wherein said second pin is further defined as being staked to said second shaft member.

7. The double pivot tilt joint of claim 5 wherein said second pin is further defined as being press fit to said second shaft member.

8. The double pivot tilt joint of claim 1 wherein said first pivot pin and said second pivot pin are slidably engaged with said pivot block.

9. A double pivot tilt joint comprising:
   a first shaft member;
   a first pivot pin having a longitudinal axis and extending at least partially through said first shaft member and slidably engaged along said longitudinal axis with said first shaft member;
   a pivot block slidably receiving said first pivot pin such that said first shaft member and said pivot block are pivotally coupled to one another about said first pivot pin;
   a second pivot pin extending at least partially through said pivot block transverse to said first pivot pin and slidable engaged with said pivot block;
   a second shaft member receiving said second pivot pin such that said pivot block and said second shaft member are pivotally coupled to one another about said second pivot pin and wherein said second pivot pin is fixed to said second shaft member; and
   a groove defined by said first pivot pin and receiving said second pivot pin.

10. The double pivot tilt joint of claim 9 wherein said groove is annular.

11. The double pivot tilt joint of claim 10 wherein said groove is further defined as extending fully around said first pivot pin.

12. The double pivot tilt joint of claim 9 wherein said second pivot pin includes an outer surface and wherein a shape of said groove corresponds to said outer surface.

13. The double pivot tilt joint of claim 12 wherein said outer surface is cylindrical and said shape of said groove is semi-circular.

14. The double pivot tilt joint of claim 9 wherein said second pin is further defined as being staked to said second shaft member.

15. The double pivot tilt joint of claim 9 wherein said second pin is further defined as being press fit to said second shaft member.

* * * * *